United States Patent
Jung (10) Patent No.: US 10,549,709 B2
(45) Date of Patent: Feb. 4, 2020

(54) CURTAIN AIRBAG FOR VEHICLE

(71) Applicant: Autoliv Development AB, Vargarda (SE)

(72) Inventor: Yong Hyun Jung, Hwasung-Si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/560,551

(22) PCT Filed: Feb. 17, 2016

(86) PCT No.: PCT/KR2016/001598
§ 371 (c)(1),
(2) Date: Sep. 22, 2017

(87) PCT Pub. No.: WO2016/153175
PCT Pub. Date: Sep. 29, 2016

(65) Prior Publication Data
US 2018/0050652 A1    Feb. 22, 2018

(30) Foreign Application Priority Data

Mar. 24, 2015    (KR) .......................... 10-2015-0040991

(51) Int. Cl.
*B60R 21/232*    (2011.01)
*B60R 21/2338*    (2011.01)

(52) U.S. Cl.
CPC ........ *B60R 21/232* (2013.01); *B60R 21/2338* (2013.01); *B60R 2021/23386* (2013.01)

(58) Field of Classification Search
CPC .................................................. B60R 21/232
See application file for complete search history.

(56) References Cited

U.S. PATENT DOCUMENTS

| | | | |
|---|---|---|---|
| 5,783,193 A | 7/1998 | Michael et al. | |
| 7,967,334 B2 | 6/2011 | Breuninger et al. | |
| 8,998,250 B2* | 4/2015 | Kruse | B60R 21/232 |
| | | | 280/729 |
| 9,539,978 B2* | 1/2017 | Mazanek | B60R 21/232 |
| 2005/0073135 A1 | 4/2005 | Choi | |

(Continued)

FOREIGN PATENT DOCUMENTS

| JP | 2014151661 A | 8/2014 |
|---|---|---|
| JP | 2014151734 A | 8/2014 |

(Continued)

OTHER PUBLICATIONS

International Search Report and Written Opinion for PCT/KR2016/001598, dated May 26, 2016; ISA/KR.

*Primary Examiner* — Karen Beck
*Assistant Examiner* — Joselynn Y Sliteris
(74) *Attorney, Agent, or Firm* — Stephen T. Olson; Harness, Dickey & Pierce, P.L.C.

(57) ABSTRACT

A curtain airbag apparatus includes a series of main chambers formed to flatways cover an inner side structure of the vehicle upon inflation; and a head receiving region formed at a front portion of the curtain airbag concavely upwardly in a length direction of the vehicle to receive a head of an occupant when the head of the occupant comes into contact with a driver seat airbag and slide in front and lateral directions of the vehicle in an inflated state of the driver seat airbag.

18 Claims, 6 Drawing Sheets

(56) References Cited

U.S. PATENT DOCUMENTS

2013/0023442 A1 1/2013 Chung et al.
2015/0115581 A1 4/2015 Mazanek et al.

FOREIGN PATENT DOCUMENTS

| JP | 2015500164 A | 1/2015 | | |
|---|---|---|---|---|
| KR | 1020140147627 A | 12/2014 | | |
| WO | WO-2013081530 A1 | * | 6/2013 | ........... B60R 21/232 |

* cited by examiner

CURTAIN AIRBAG FOR VEHICLE

TECHNICAL FIELD

The invention relates to a curtain airbag for a vehicle, which is configured to inflate and deploy along an interior side surface of the vehicle upon a vehicle side impact collision or rollover.

BACKGROUND ART

In recent years, high levels of safety performance of vehicles have been required. This trend is shared across countries around the world where most vehicles are currently standard-equipped with airbags as vehicle safety devices. Firms involved in vehicle development have adopted ongoing safety improvement as a major development guideline. In keeping with this, new airbags are continually being developed.

Standards for evaluating vehicle safety differ from country to country, and firms approach product development such that products can meet evaluation standards in multiple countries. In the United States, for instance, which has the largest automobile fleet in the world Federal Motor Vehicle Safety Standards (FMVSS) are issued by the National Highway Traffic Safety Administration (NHTSA). In a Notice of Proposed Rulemaking (NPRM) for FMVSS, a requirement is proposed that aims at "reducing the probability of occupant ejection from a vehicle through a side window using an ejection mitigation system in the event of a side impact or rollover". The requirement can be met by providing a side curtain airbag as a device intended to reduce ejection from a vehicle, such that the side curtain airbag constitutes the ejection mitigation system.

The curtain airbag for the vehicle is installed at the upper end in the vehicle so as to inflate and deploy upon a vehicle collision. The side curtain airbag provides high levels of safety performance upon a rollover as well as a side impact collision of the vehicle.

Meanwhile, for the protection of the occupant, a driver seat airbag is designed as most often a round bag and in the inflated state covers the steering wheel, is further provided in the steering wheel of the vehicle as well. As the steering wheel naturally is arranged to perform a rotational movement, with a steering wheel hub not being fixed the airbag as well performs this rotational movement, so that the airbag itself needs to be deigned to be symmetric and in particular to be round, in order that it can fulfill its protective function independent of the position of the steering wheel.

In the event of an accident, during the occurring forward movement the occupant generally is protected by the curtain airbag and the driver seat airbag. Upon a vehicle collision, the head of the occupant collides with the driver seat airbag and may be inserted into a gap between the curtain airbag and the driver seat airbag.

DISCLOSURE OF INVENTION

Technical Problem

An object of the invention is to provide a curtain airbag for a vehicle, which can receive the head of the occupant when the head of the occupant is inserted into the gap between the curtain airbag and the driver seat airbag after coming into contact with the driver seat airbag.

Another object of the invention is to provide a curtain airbag for a vehicle, which can secondarily protect the head of the occupant by preventing the head of the occupant from being inserted into the gap between the curtain airbag and the driver seat airbag and from being rotated.

Still another object of the invention is to provide a curtain which is installed at a side portion of a roof panel in a folded state to be extended from a front pillar to a rear pillar and inflated and deployed along an inner side surface of the vehicle in a curtain shape upon side impacts or rollover of the vehicle, airbag for a vehicle configured such that, upon inflation of the curtain airbag, a front lower end of the curtain airbag can be positioned at an inner side structure below the window of the vehicle.

Solution to Problem

According to an exemplary embodiment of the invention, there is provided a curtain airbag for a vehicle. The curtain airbag includes a series of main chambers; and a head receiving region concavely formed at a front portion of the curtain airbag and inclined upwardly in a length direction of the vehicle to receive a head of an occupant when the head of the occupant comes into contact with an inflated driver seat airbag and moves in front and lateral directions of the vehicle. The head receiving region may comprise a shape substantially corresponding to a contour of the head of the occupant coming into contact with the head receiving region.

Wherein a vertical length of a front end of the curtain airbag may be the same with a vertical length of a rear end of the curtain airbag, and the curtain airbag may further comprise a reinforcement structure configured to allow a front lower portion of the curtain airbag to come into contact with an inner side structure below a window of the vehicle in an inflated state of the curtain airbag.

The head receiving region may comprise a non-inflatable region formed at a front portion of the main chambers.

The reinforcement structure may be formed to define the main chambers in such a way that, at the front portion of the main chambers, inflation gas flows from a lower portion of the curtain airbag toward an upper portion of the curtain airbag.

The reinforcement structure may comprise a non-inflatable region that defines the front portion of the main chambers in a canyon shape such that, upon inflation of the curtain airbag, a front upper end of the main chambers comes into contact with a lower end of a front pillar of the vehicle, and a front lower end portion of the main chambers may be positioned at the inner side structure below the window of the vehicle.

The non-inflatable region may be defined by a chamber wall that defines the front portion of the main chambers in a "U" shape.

The head receiving region may be formed together with the chamber wall by modifying a distance between middle portions of the chamber wall and the lengths of the middle portions of the chamber wall during forming the chamber wall.

Advantageous Effects of Invention

According to one exemplary embodiment of the invention, the head of the occupant can be primarily stopped by the head receiving region concavely formed at the front portion of the curtain airbag and inclined upwardly in a length direction of the vehicle in the event that the head of the occupant is rotated while being inserted into the gap between the curtain airbag and the driver seat airbag, thereby protecting the head of the occupant.

According to one exemplary embodiment of the invention, the protruding chamber is provided parallel with the head receiving region formed at the curtain airbag upwardly in the length direction of the vehicle, thereby secondarily preventing the movement of the head of the occupant.

According to one exemplary embodiment of the invention, the front portion of the main chamber of the curtain airbag includes the canyon shape. Accordingly, upon inflation of the curtain airbag, the front upper end of the main chamber comes into contact with the lower end of the front pillar, thereby relatively lowering the front portion of the curtain airbag. As a result, an overlapping area between the interior surface of the door below the side window of the vehicle and the curtain airbag is relatively increased, and the supporting strength of the curtain airbag against the inner side structure of the vehicle is increased, thereby improving the protection effect of the head of the occupant.

MODE FOR THE INVENTION

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention.

In the following description, side curtain airbags for a vehicle according to various embodiments of the present invention, which are substantially installed at a side portion of a roof panel in a folded state to be extended from a front pillar to a rear pillar and inflated and deployed along an inner side surface of the vehicle in a curtain shape upon side impacts or rollover of the vehicle, will be described.

Figure 1:
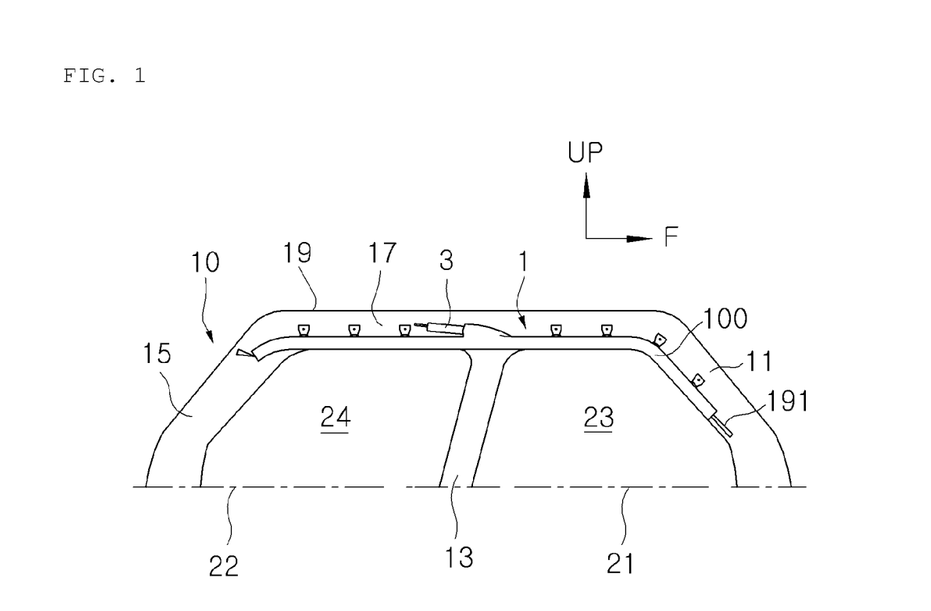
FIG. 1 is a side view showing the interior of a vehicle with a curtain airbag mounted in the vehicle in a folded state according to an exemplary embodiment of the invention.

FIG. 1 is a side view showing the interior of a vehicle with a curtain airbag mounted in the vehicle in a folded state according to an exemplary embodiment of the invention.

Referring to FIG. 1, a curtain airbag apparatus 1 is installed to a roof side rail 17 located at an upper edge above a window of a vehicle body 10 in a folded state along the longitudinal direction.

The vehicle body 10 includes a front pillar 11, a center pillar 13, a rear pillar 15, and a roof side rail 17 coupled to the respective upper ends of the pillars 11, 13, and 15. The roof side rail 17 extends in the forward-rearward direction of the vehicle 10 to support a roof 19. The roof side rail 17 is installed along the edge of the roof 19.

The vehicle body 10 includes a front side door 21 installed between the front pillar 11 and the center pillar 13 and a rear side door 22 installed between the center pillar 13 and the rear pillar 15. A front window 23 is arranged at an upper portion of the front side door 21, and a rear window 24 is arranged at an upper portion of the rear side door 22.

The curtain airbag apparatus 1 is installed in the roof side rail 17. The curtain airbag apparatus 1 includes a curtain airbag 100 mounted to the roof side rail 17 in a folded state along upper edges of the front and rear side windows 23 and 24, and an inflator 3 to generate gas upon a vehicle collision.

The inflator 3 is coupled to an upper central portion of the airbag 100 between the front side seat and the rear side seat. In another embodiment, the inflator 3 may be coupled to an upper rear end or an upper front end of the curtain airbag 100.

When the impact of more than a predetermined level is applied to the lateral part of the vehicle 10, the gas is generated from the inflator 3, and the gas generated from the inflator 3 is supplied into the curtain airbag 100. The airbag 100 covers the inner side structures, such as front/rear side windows 23 and 24, front/rear side doors 21 and 22 while being downwardly deployed.

Figure 2:
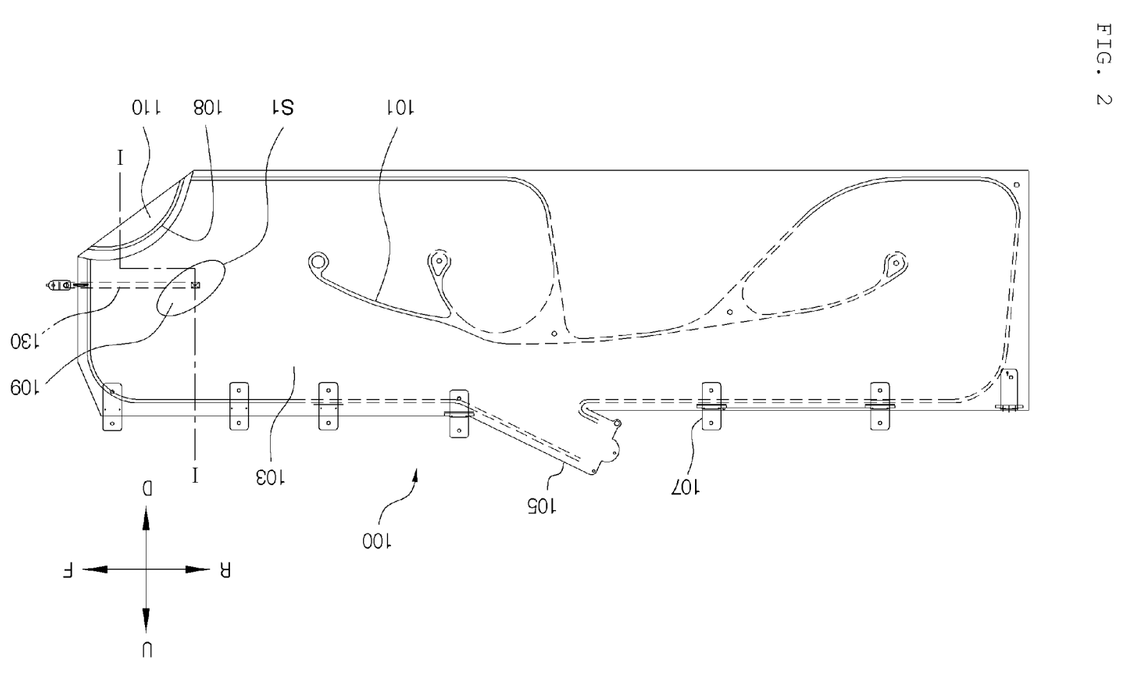
FIG. 2 is a side view showing a curtain airbag according to an exemplary embodiment of the invention.
Figure 3:
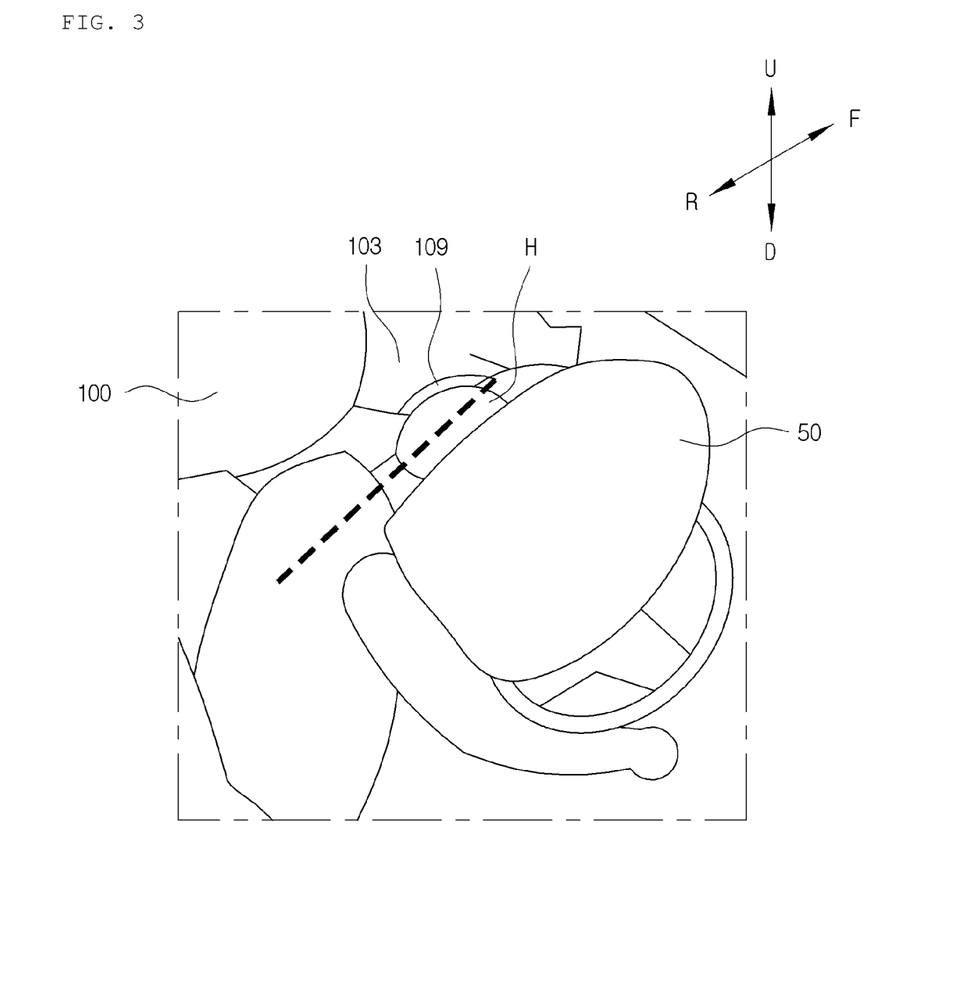
FIG. 3 is a perspective view showing the interior of a vehicle with an inflated curtain airbag and a driver seat airbag according to an exemplary embodiment of the invention.

FIG. 2 is a side view showing a curtain airbag according to an exemplary embodiment of the invention, and FIG. 3 is a perspective view showing the interior of a vehicle with an inflated curtain airbag and driver seat airbag according to an exemplary embodiment of the invention.

Referring to FIGS. 2 and 3, the curtain airbag 100 is formed in a sack shape formed to include a length extending in the front and rear directions of the vehicle. The curtain airbag 100 is made with two fabric layers or a single fabric layer which is woven in one piece according to a one-piece woven technology.

The curtain airbag 100 includes a series of main chambers 103 defined by a plurality of chamber walls 101 formed along the edges of the curtain airbag 100 and formed in a transversal and/or vertical direction. The main chamber 103 flatways covers the inner side structure of the vehicle, such as insides of the windows and doors.

A gas introduction portion 105 is provided at the central upper portion of the curtain airbag 100. The gas introduced through the gas introduction portion 105 flows into main chambers 103 through an upper passage formed by the chamber walls. A plurality of mounting tabs 107 are provided at the upper edge of the curtain airbag 100, which are mounted to the inner side structures of the vehicle through a fastening member (not shown).

The curtain airbag 100 includes a head receiving region 109 formed in the front portion of the curtain airbag 100 for receiving the head H of the occupant when a vehicle collision occurs.

The head receiving region 109 is provided at the front portion of the curtain airbag 100 such that, upon a vehicle collision, the head H of the occupant, which is ejected in the front and lateral directions of the vehicle, can be received in the head receiving region 109 and prevented from being rotated.

The head receiving region 109 is concavely formed and inclined upwardly in a length direction of the curtain airbag 100 and has a substantially oval shape. The slope of the head receiving region 109 is defined to receive the head H of the occupant when the head H of the occupant comes into contact with the driver seat airbag 50 and is inserted into the gap G between the curtain airbag 100 and the driver seat airbag 50.

Upon a vehicle collision, the occupant is moved in the front direction of the vehicle due to rapid reduction of speed of the vehicle, the head of the occupant is inserted into the gap G between the curtain airbag 100 and the driver seat airbag 50 after colliding with the driver seat airbag 50. As a result, the head H of the occupant is moved between the curtain airbag 100 and the driver airbag 50 in a state the head H of the occupant is inclined toward the front of the vehicle.

The head receiving region 109 receives the head H of the occupant, which protrudes toward the front of the vehicle, so that the head H of the occupant is prevented from being rotated. The head receiving region 109 has an inclined shape upwardly in front and rear directions of the vehicle, so that, upon a vehicle collision, the head receiving region 109 is aligned with the inclined head H of the occupant.

The head receiving region 109 may have any shapes corresponding to the contour of the head of the occupant, which is inclined upon a vehicle collision, so that the inclined head of the occupant can be received in the head receiving region 109. The head receiving region 109 may have an oval shape.

The head receiving region 109 may be formed by a sewing line S1 formed in an oval shape. In another embodiment, the head receiving region 109 may be made in one step when manufacturing the curtain airbag 100 with the one-piece woven technology.

Figure 4:
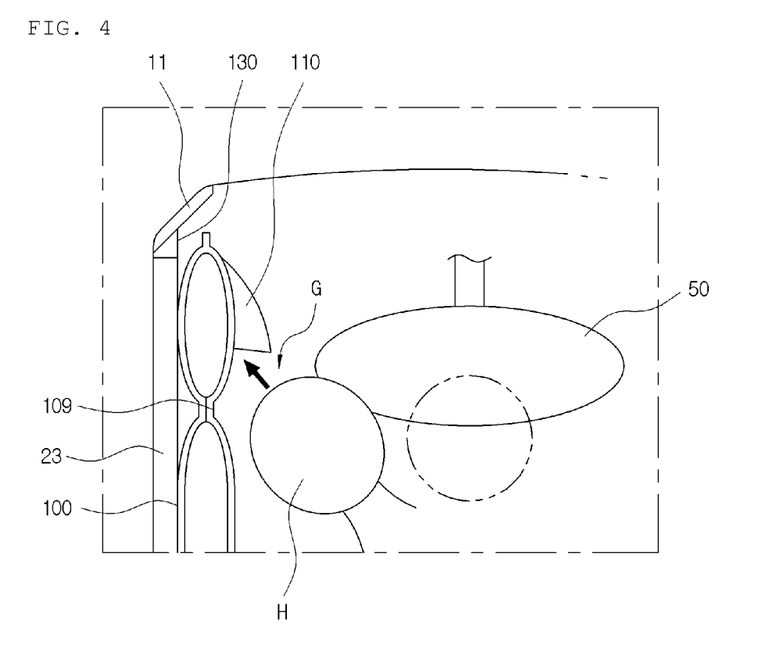
FIG. 4 is a top view showing a vehicle with an inflated curtain airbag and a driver seat airbag according to an exemplary embodiment of the invention.

FIG. 4 is a top view showing a vehicle with an inflated curtain airbag and a driver seat airbag according to an exemplary embodiment of the invention.

Referring to FIGS. 2 and 4, the curtain airbag 100 further includes a protruding chamber 110 provided below the head receiving region 109 so as to improve the effect for stopping the movement of the head H of the occupant.

The protruding chamber 110 is formed by folding a front lower corner 108 of the curtain airbag 100 toward the head receiving region 109 of the curtain airbag 100.

The protruding chamber 110 relatively protrudes toward the interior of the vehicle relative to the main chambers 103. As a result, upon a collision, the head H of the occupant is secondarily restricted after the head H of the occupant is primarily restricted by the head receiving region 109. Accordingly, the head H of the occupant is additionally prevented from protruding toward the front of the vehicle, thereby effectively protecting the head H of the occupant.

The front portion of the curtain airbag 100 may be fixed to a vehicle body, such as the front pillar 11 by a connecting strap 130. One end of the connecting strap 130 is connected to head receiving region 109 in an outer panel of the curtain airbag 100, which faces the inner side structure of the vehicle, and the other end of the connecting strap 130 is connected to the front pillar 11.

In such a configuration, upon inflation of the curtain airbag 100, the curtain airbag 100 is pulled toward the front of the vehicle, thereby firmly supporting the inflated curtain airbag 100.

In the following description, a configuration for reinforcing the supporting strength of the protruding chamber 110 will be described.

Figure 5:
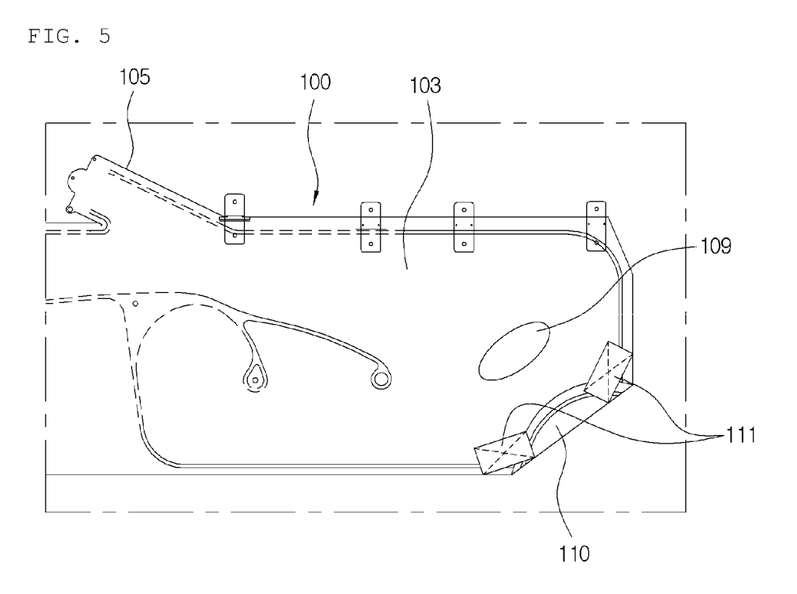
FIG. 5 is a side view showing a state in which a protruding chamber of a curtain airbag of a vehicle is supported by a reinforcement strap according to an exemplary embodiment of the invention.

FIG. 5 is a side view showing a state in which a protruding chamber of a curtain airbag of a vehicle is supported by a reinforcement strap according to an exemplary embodiment of the invention.

Referring to FIG. 5, upper and lower portions of the protruding chamber 110 that is substantially folded in a triangular shape are supported to an inner panel of the curtain airbag by a reinforcement strap 111. Upon inflation of the curtain airbag 100, the reinforcement strap 111 tightly pulls the protruding chamber 110 toward the main chamber 103, so that the protruding chamber 110 is supported at a predetermined position.

The reinforcement strap 111 supports the protruding chamber 110 protruding toward the interior of the vehicle by a certain force, so that the movement of the protruding chamber 110 is restricted. In other words, the reinforcement strap 111 tightly pulls the protruding chamber 110 toward the main chamber 103, thereby supporting the protruding chamber 110 at a certain positon.

The protruding chamber 110 supported by the reinforcement strap 111 effectively prevents the head of the occupant, which is primarily restricted by the head receiving region 109, from being moved in front and lateral directions of the vehicle.

Figure 6:
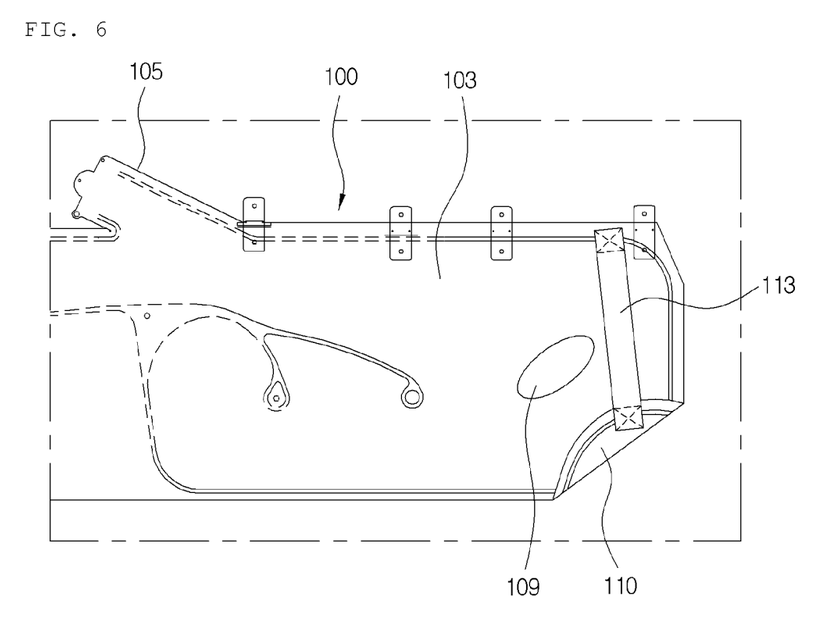
FIG. 6 is a side view showing a state in which a protruding chamber of a curtain airbag of a vehicle is supported by a reinforcement strap according to another exemplary embodiment of the invention.

FIG. 6 is a side view showing a state in which a protruding chamber of a curtain airbag of a vehicle is supported by a reinforcement strap according to another exemplary embodiment of the invention.

Referring to FIG. 6, the protruding chamber 110 is fixed to the inner panel of the curtain airbag 110 by a reinforcement strap 113. One end of the reinforcement strap 113 is connected to an upper central portion of the protruding chamber 110, i.e. a front lower corner of the curtain airbag 100, and the other end of the reinforcement strap 113 is connected to an upper edge of the inner panel of the curtain airbag 100.

The above mentioned reinforcement straps 111 and 113 may be configured with the fabric materials that are the same with the materials of the curtain airbag 100 or tether.

In the following description, a configuration for improving the protection effect of the occupant will be described. In the configuration, a front lower end portion of the curtain airbag is relatively downwardly positioned at lower portion below the window side of the vehicle, so that, upon inflation of the curtain airbag, the curtain airbag is firmly supported to the inner side structure of the vehicle.

Hereinafter, the curtain airbag is given with numbers of 200s, and repeated description about components similar with the components as described above will be omitted.

Figure 7:
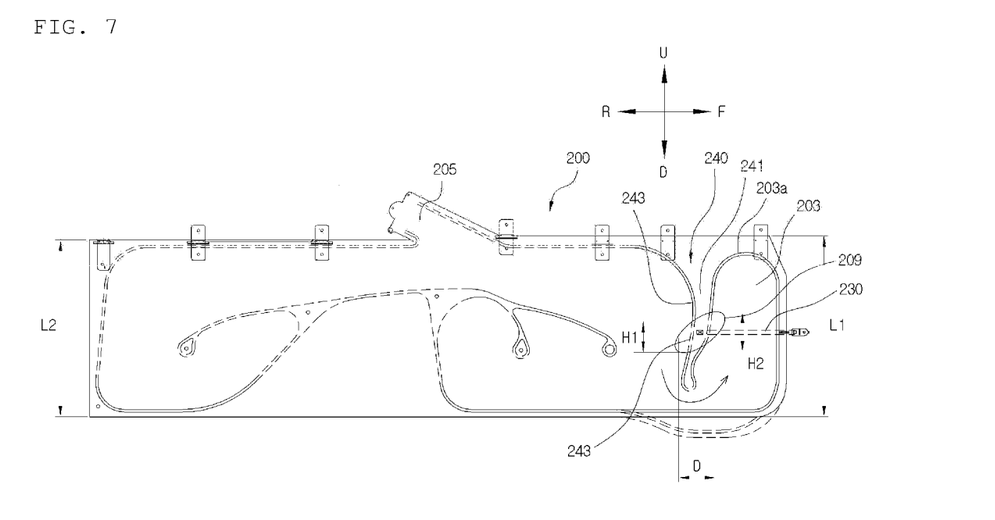
FIG. 7 is a side view showing a curtain airbag for a vehicle according to another exemplary embodiment of the invention.
Figure 8:
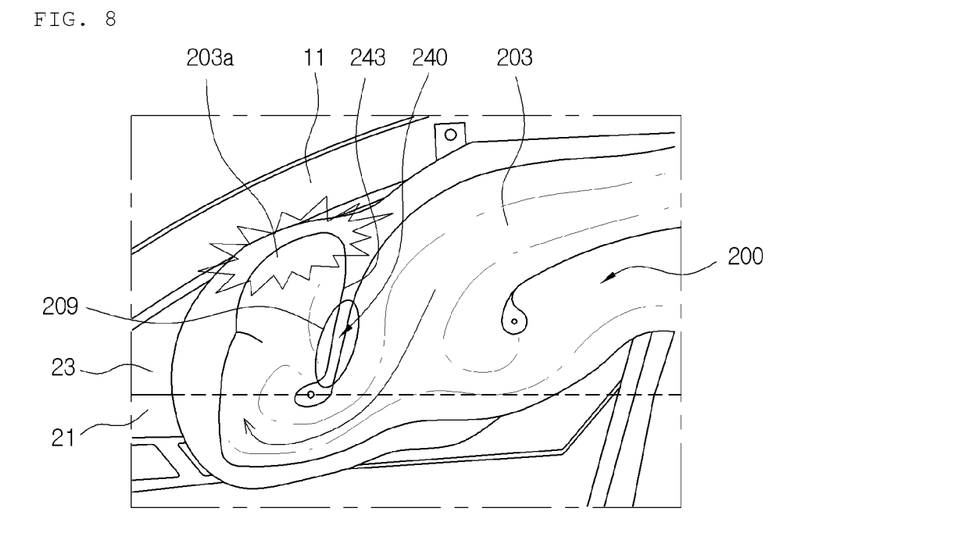
FIG. 8 is a side view showing the interior of a vehicle with an inflated curtain airbag for the vehicle according to another exemplary embodiment of the invention.

FIG. 7 is a side view showing a curtain airbag for a vehicle according to another exemplary embodiment of the invention, and FIG. 8 is a side view showing the interior of a vehicle with an inflated curtain airbag for the vehicle according to another exemplary embodiment of the invention.

Referring to FIGS. 7 and 8, the vertical lengths L1 and L2 of front and rear ends of the airbag 200 are the same with each other, and the curtain airbag 200 includes a reinforcement structure 240 configured to allow the front lower end portion of the curtain airbag 200 to make contact with the lower portion side below the window of the vehicle, such as an inner side of the door upon inflation of the curtain airbag 100.

The reinforcement structure 240 is formed to define the main chamber 203 in such a way that, at the front portion of the main chamber 203, the inflation gas can flow from a lower portion of the curtain airbag 200 to an upper portion of the curtain airbag 200.

The reinforcement structure 240 may include a non-inflatable region 241 that defines the front portion of the main chamber 203 in a canyon shape, so that, upon inflation of the curtain airbag 200, a front upper end of the main chamber 203 comes into contact with a lower end of the front pillar 11 of the vehicle, and a front lower end part of the main chamber 203 is positioned at the inner structure side below the window of the vehicle.

The non-inflatable region 241 may be defined by a chamber wall 243 that defines the front portion of the main chamber 203 in a "U" shape.

The chamber wall 243 may be formed with a sewing line. In another embodiment, the non-inflatable region 241 can be formed when manufacturing the curtain airbag 200 in the one-piece woven technology.

In the curtain airbag 200 configured as described above, the inflation gas introduced through the gas introduction portion 205 flows toward the front of the curtain airbag 200, and then substantially in a U shape through the front chamber defined by the non-inflatable region 241.

Since the inflation gas is supplied in the U shape, a front upper end 203a of the main chamber 203 comes into contact with a lower end of the front pillar 11. As a result, the front portion of the curtain airbag 200 is relatively downwardly moved, thereby relatively increasing an area overlapping with the door 21 below the window 23. The curtain airbag 200 is firmly supported to the inner side structure of the vehicle by the increased overlapping area, thereby improving the inflation and protection characteristics of the curtain airbag 200. In particular, the head H of the occupant can be prevented from being inserted between the lower portion of the curtain airbag 200 and the side door 21 of the vehicle.

Since the overlapping area of the lower part of the curtain airbag 200 is increased, the supporting strength of the curtain airbag 200 is increased. Accordingly, the occupant is prevented from colliding directly with the inner side structure of the vehicle, thereby, preventing the occupant from being severely injured or being thrown out of the window. That is, the increased overlapping area firmly supports the lower portion of the head receiving region 209 also when the head of the occupant is received in the head receiving region 209, thereby enhancing the protection effect of the head of the occupant.

In the above configuration, even if the vertical lengths L1 and L2 of the curtain airbag 200 are the same with each other, the front lower portion of the curtain airbag 200 can be relatively downwardly positioned when the curtain airbag 200 is inflated. Accordingly, it is not necessary to provide a special extended portion at the front lower portion of the curtain airbag 200. In this case, when cutting out a plurality of curtain airbags in a single material, a portion to be wasted can be minimized, thereby reducing the material costs.

The head receiving region 209 may partially overlap with the non-inflatable region 241. The head receiving region 209 is formed with an oval non-inflatable region, which is upwardly inclined in a length direction of the curtain airbag 200. Like the chamber walls 243 defining the non-inflatable region 241, the head receiving region 209 may be defined with a sewing line. In another embodiment, the head receiving region 209 may be also formed when manufacturing the curtain airbag 200 in the one-piece woven technology.

The head receiving region 209 may be formed by modifying a distance D between middle portions of the chamber walls 243 and lengths H1 and H2 of the middle portions of the chamber walls 243 when the chamber walls 243 is formed. In some embodiments, when the curtain airbag 200 is manufactured in the one-piece woven technology, the head receiving region 209 may be formed together.

The head receiving region 209 is configured to receive the head of the occupant, which is inserted in the gap between the driver seat airbag 50 and the curtain airbag 200, so that the rotation of the head of the occupant can be prevented. The head receiving region 209 may be formed by modifying the distance D between the middle portions of the chamber walls 243 and lengths H1 and H2 of middle portions of the chamber walls 243 that defines the non-inflatable region 241. The head receiving region 209 may be variously changed by variously modifying the distance D and the lengths H1 and H2, and curved lengths of chamber walls within the length (H1 and H2) regions.

One end of the connecting strap 230 is coupled to a region between the chamber walls 243, i.e. the head receiving region 209 on the outer panel of the curtain airbag 200, and the other end of the connecting strap 230 is coupled to the vehicle body, such as the front pillar, so that the supporting strength of the curtain airbag 200 is reinforced. The connecting strap 230 pulls the curtain airbag 200 toward the front of the vehicle upon inflation of the curtain airbag 200, so that the inflated curtain airbag 200 is firmly supported.

As a result, the head H of the occupant is firmly received in the head receiving region 209, thereby effectively preventing the rotation of the head H of the occupant.

The reinforcement structure 240 may be configured in an extension chamber extending from the front lower end of the curtain airbag 200 (see the marked portion in the dotted line in FIG. 7). In this case, the material consumption for the curtain airbag is increased, and the wasted portion is increased to some extent.

Although the exemplary embodiments of the present invention have been described, it is understood that the exemplary embodiments help one ordinary skilled in the art to easily realize the present invention should not be limited to these exemplary embodiments and accompanying drawings. Therefore, various changes and modifications can be apparently made by the skilled in the art without departing from the technical sprit of the present invention. In addition, it is understood that parts that can be easily changed by the skilled in the art are within the spirit and scope of the present invention as hereinafter claimed.

The invention claimed is:

1. A curtain airbag for a vehicle, the curtain airbag comprising:
   a series of main chambers formed to flatways cover an inner side structure of the vehicle upon inflation;
   a reinforcement structure configured to allow a front lower portion of the curtain airbag to come into contact with the inner side structure below a window of the vehicle in an inflated state of the curtain airbag, the reinforcement structure formed to allow inflation gas flows from a lower portion of the curtain airbag to an upper portion of the curtain airbag, the reinforcement structure includes a non-inflatable region defined by chamber walls; and
   a head receiving region formed at a front portion of the curtain airbag and configured to receive a head of an occupant when the head of the occupant comes into contact with a driver seat airbag and slides in front and lateral directions of the vehicle in an inflated state of the driver seat airbag, wherein the head receiving region is recessed into the curtain airbag upon inflation of the curtain airbag and configured to receive the head of the occupant coming into contact with the head receiving region, and wherein the head receiving region is partially overlapped with the non-inflatable region, wherein the head receiving region is oval shaped, non-inflatable, and upwardly inclined in a length direction of the curtain airbag and overlapping first and second chamber wall portions of the chamber walls, and wherein the non-inflatable region extends substantially vertically and extends vertically below the head receiving region.

2. The curtain airbag of claim 1, wherein a vertical length of a front end of the curtain airbag is same with a vertical length of a rear end of the curtain airbag.

3. The curtain airbag of claim 1, wherein the non-inflatable region is formed in a front portion of the curtain airbag.

4. The curtain airbag of claim 1 wherein the chamber walls define a front portion of the curtain airbag in a "U" shape.

5. The curtain airbag of claim 4, wherein the head receiving region is formed together with the chamber walls by modifying a distance between middle portions of the chamber walls and the lengths of the middle portions of the chamber walls during forming the chamber walls.

6. The curtain airbag of claim 1, wherein the head receiving region is concave.

7. The curtain airbag of claim 1, wherein the head receiving region is defined by an oval shaped sew line.

8. A curtain airbag for a vehicle, comprising:

an inflatable airbag extending in a longitudinal direction and defining an inflatable chamber, the inflatable chamber including a U-shaped front portion having a first inflatable leg longitudinally spaced from a second inflatable leg such that a non-inflatable region is longitudinally disposed between the first and second inflatable legs; and a head receiving region formed at the U-shaped front portion, wherein the head receiving region is recessed into the curtain airbag upon inflation of the curtain airbag and configured to receive a head of an occupant coming into contact with the head receiving region, and wherein the head receiving region is partially overlapped with the non-inflatable region;

wherein the head receiving region is oval shaped, non-inflatable, and upwardly inclined in a length direction of the curtain airbag and overlapping first and second chamber wall portions of chamber walls of the non-inflatable regions, and wherein the non-inflatable region extends substantially vertically and extends vertically below the head receiving region.

9. The curtain airbag of claim 8, wherein a vertical length of a front end of the curtain airbag is same with a vertical length of a rear end of the curtain airbag.

10. The curtain airbag of claim 8, wherein the head receiving region is formed together with the chamber walls by modifying a distance between middle portions of the chamber walls and the lengths of the middle portions of the chamber walls during forming the chamber walls.

11. The curtain airbag of claim 8, wherein the head receiving region is concave.

12. The curtain airbag of claim 8, wherein the head receiving region is defined by a sewing line.

13. The curtain airbag of claim 8, further comprising a gas introduction port at an upper side of the inflatable airbag, the gas introduction port in fluid communication with the U-shaped front portion such that an inflation gas first travels downwardly along the first inflatable leg, subsequently passes below the non-inflatable region and finally enters the second inflatable leg.

14. A method of deploying the curtain airbag of claim 13, the method comprising:

introducing the inflation gas through the gas introduction port such that the inflation gas first travels downwardly along the first inflatable leg, subsequently passes below the non-inflatable region and finally enters the second inflatable leg.

15. The method of deploying the curtain airbag of claim 14, comprising inflating the curtain airbag such that a front upper end of the curtain airbag contacts a lower end of a front pillar of the vehicle.

16. The curtain airbag of claim 8, wherein the non-inflatable region is defined by a chamber wall that defines the front portion in the U-shape.

17. The curtain airbag of claim 16, wherein the chamber wall is defined by a sewing line.

18. A curtain airbag for a vehicle, the curtain airbag comprising:

a series of chambers formed to flatways cover an inner side structure of the vehicle upon inflation;

a head receiving region formed at a front portion of the curtain airbag configured to receive a head of an occupant; and a non-inflatable region separating first and second chambers of the series of chambers, the non-inflatable region extending substantially vertically downward from an upper side of the curtain airbag, wherein the head receiving region is recessed into the curtain airbag upon inflation of the curtain airbag and configured to receive the head of the occupant coming into contact with the head receiving region, and wherein the head receiving region is partially overlapped with the non-inflatable region, wherein the head receiving region is oval shaped, non-inflatable, and upwardly inclined in a length direction of the curtain airbag and overlapping first and second chamber wall portions of the non-inflatable region, and wherein the non-inflatable region extends vertically below the head receiving region.

* * * * *